(12) United States Patent  
Chen et al.

(10) Patent No.: US 7,573,856 B2  
(45) Date of Patent: Aug. 11, 2009

(54) POWER-BASED RATE ADAPTATION OF WIRELESS COMMUNICATION CHANNELS

(75) Inventors: Wanshi Chen, San Diego, CA (US); Reza Shahidi, Kista (SE); Alpaslan Savas, San Diego, CA (US); Long Duan, San Diego, CA (US); Joakim Hulten, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 990 days.

(21) Appl. No.: 10/721,951

(22) Filed: Nov. 25, 2003

(65) Prior Publication Data

US 2005/0113104 A1    May 26, 2005

(51) Int. Cl.  
*H04W 4/00* (2006.01)

(52) U.S. Cl. .................. 370/338; 370/278; 455/522

(58) Field of Classification Search .......... 370/311, 370/329, 335, 342, 465, 468, 252, 332, 486, 370/278, 338; 455/68, 69, 13.4, 127.1, 522  
See application file for complete search history.

(56) References Cited

U.S. PATENT DOCUMENTS

| | | | |
|---|---|---|---|
| 5,070,536 A | 12/1991 | Mahany et al. | |
| 6,393,005 B1 * | 5/2002 | Mimura | 370/335 |
| 6,487,394 B1 * | 11/2002 | Ue et al. | 455/69 |
| 6,505,035 B2 * | 1/2003 | Ue et al. | 455/69 |
| 6,690,944 B1 * | 2/2004 | Lee et al. | 455/522 |
| 6,954,434 B2 * | 10/2005 | Matsuki | 370/252 |
| 2001/0040880 A1 * | 11/2001 | Chen et al. | 370/337 |
| 2002/0072384 A1 * | 6/2002 | Chheda | 455/522 |
| 2002/0082039 A1 * | 6/2002 | Ue et al. | 455/522 |
| 2002/0141349 A1 * | 10/2002 | Kim et al. | 370/252 |
| 2003/0007456 A1 | 1/2003 | Gupta et al. | |
| 2003/0050086 A1 * | 3/2003 | Lee et al. | 455/522 |
| 2003/0099222 A1 * | 5/2003 | Cordier et al. | 370/342 |
| 2004/0090934 A1 * | 5/2004 | Cha et al. | 370/329 |
| 2004/0202133 A1 * | 10/2004 | Filipovic | 370/332 |
| 2004/0264589 A1 * | 12/2004 | Kenney et al. | 375/261 |

FOREIGN PATENT DOCUMENTS

| | | |
|---|---|---|
| EP | 1 309 106 | 5/2003 |
| WO | WO 99/20016 | 4/1999 |

* cited by examiner

*Primary Examiner*—Ricky Ngo  
*Assistant Examiner*—Kan Yuen  
(74) *Attorney, Agent, or Firm*—Coats & Bennett, P.L.L.C.

(57) ABSTRACT

A radio base station (RBS) provides dynamic rate adaptation for rate-adjustable communication channels used to transmit information to remote mobile stations based on monitoring transmit power information associated with those channels. For a given channel, the RBS tracks an average channel power on a per transmit frame basis and compares the average to first and second rate adjustment thresholds, which comparisons trigger downward or upward rate adjustments. Similar operation also may be based on averaging the power control commands returned by the mobile station, which indicate whether the channel's power as received by the mobile station is or is not sufficient with respect to a desired signal quality. This method thus provides a mechanism for rapid rate adaptation without requiring explicit rate control signaling from the mobile stations.

33 Claims, 4 Drawing Sheets

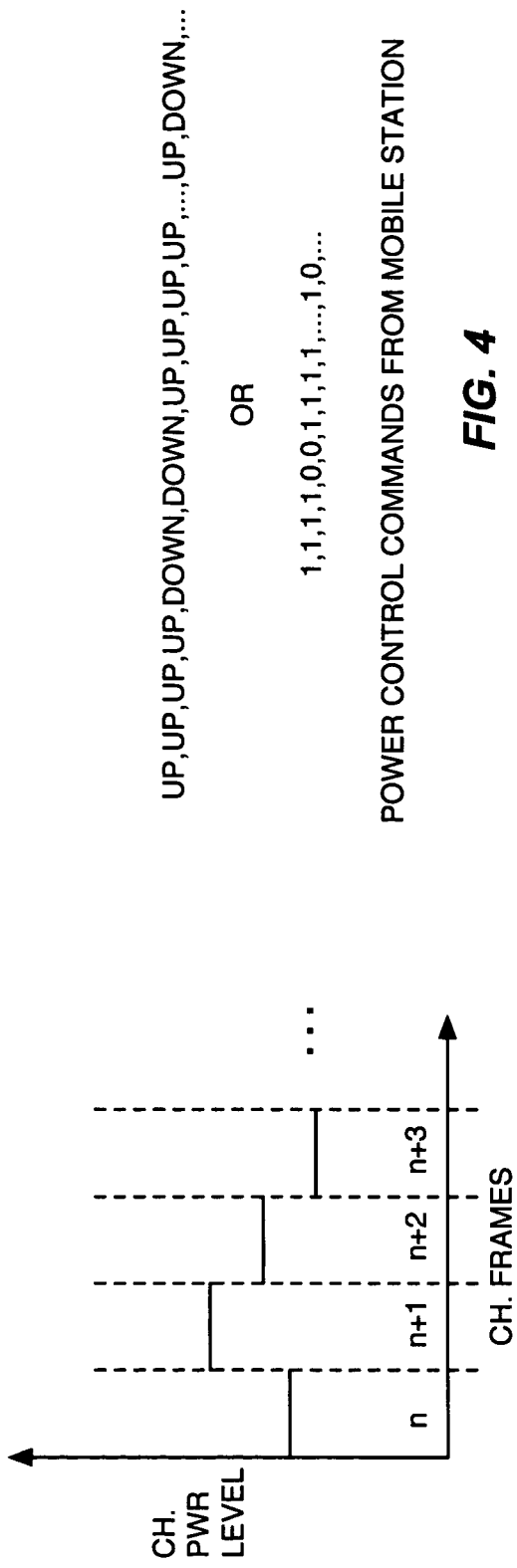
FIG. 3
FIG. 4
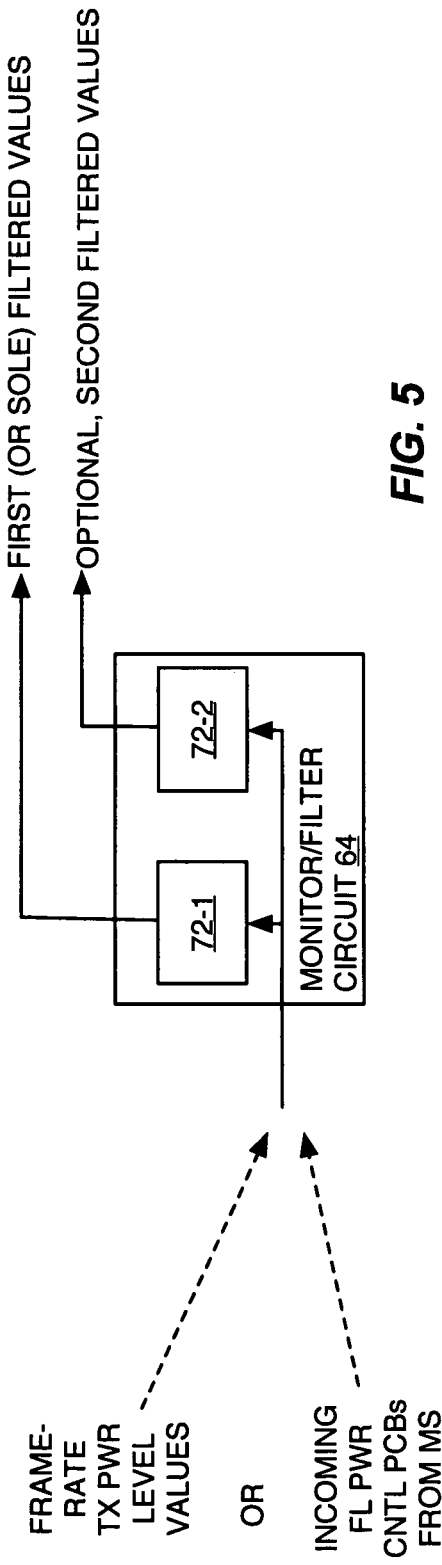
FIG. 5

POWER-BASED RATE ADAPTATION OF WIRELESS COMMUNICATION CHANNELS

BACKGROUND OF THE INVENTION

The present invention generally relates to wireless communication networks, and particularly relates to adaptive rate control of communication channels in such networks.

Evolving wireless communication networks, such as those based on the IS-2000 family of standards, offer a wide range of services including voice, data (web, email, etc.), and streaming media services. Differing applications and Quality of Service (QoS) requirements result in individual data users having differing data rate needs. IS-2000 networks typically serve individual data users on the forward link using forward link fundamental channels (F-FCHs) that support a maximum channel data rate of 9.6 kpbs. If that data rate is insufficient to meet the service requirements of a particular data user, the network assigns a forward supplemental channel (F-SCH) in conjunction with that user's F-FCH. F-SCHs are configured to have data rates expressed as a multiple of the F-FCH data rate, and thus a data user may be assigned a F-SCH rate of 1×, 2×, 4×, etc., depending on the particular service needs of that user.

Typically, the assignment of a F-SCH to a particular data user is triggered by an excess data buffer size, i.e., the queue for incoming data to be transmitted to the user is too large, or is triggered by the rate of the incoming data. Selection of a F-SCH initial date rate may be based on the predicted data throughput to the data user, or may be based on other considerations. Regardless, once the F-SCH is assigned, conventional networks either leave the initially configured rate unchanged for the duration of the assignment, or make relatively infrequent rate changes based on, for example, changes in the incoming forward link traffic (i.e., packet size or rate). In theory, the network could use frame error rate (FER) information fed back from the data user to make rate adjustments, but that would not allow timely rate adjustments because relatively long periods of time, e.g., a hundred or more received frames, are required to develop statistically accurate FER information.

Overall network performance and efficiency suffer because of the inability to intelligently adjust F-SCH data rates. That is, where the data rate of a given F-SCH is too high given the current radio conditions of the data user the channel is assigned to, the effective data rate of the channel is lowered because of the high incidence of reception errors and the transmit power allocated for the inappropriately high data rate is at least partially wasted. Of course, the converse is true, wherein the network misses opportunities to make timely increases in F-SCH data rates responsive to improving radio conditions for particular data users.

These circumstances are not limited to IS-2000 networks. Indeed, the potential for such inefficiencies arise in any communication network wherein rate-adjustable channels are assigned to users and managed without benefit of direct rate control feedback from the users.

SUMMARY OF THE INVENTION

The present invention comprises a method and apparatus to provide communication channel rate adaptation in a wireless communication network, such as in cdma2000 or Wideband CDMA (WCDMA) cellular communication networks. In an exemplary embodiment, the present invention comprises a method of channel data rate adaptation in a wireless communication network based on setting a data rate for a communication channel to be used for transmitting data to a remote receiver at a variable transmit power that is controlled upward and downward by the remote receiver as needed to achieve a desired received data quality at the remote receiver, monitoring transmit power information for the communication channel as an indication of current radio conditions at the remote receiver, and changing the data rate for the communication channel based on the transmit power information.

In an exemplary embodiment of the above method, the communication channel is a rate-adjustable data channel, such as a F-SCH transmitted from a radio base station to a remote mobile station. The radio base station has knowledge of the transmit power being used to transmit data to the mobile station on the channel, and thus can monitor that transmit power as an indication of radio conditions at the mobile station. For example, where the transmit power is on average close to an upper power limit set for the channel, the radio base station infers that the current data rate of the channel is too high. Conversely, where the transmit power is on average close to a lower power limit set for the channel the radio base station infers that the current data rate of the channel is too low. In the former case, the radio base station initiates a downward rate change for the channel and, in the latter case it initiates an upward rate change for the channel.

More generally, the radio base station compares the transmit power information to rate adjustment thresholds that trigger up or down rate adjustments if the thresholds are met or exceeded. For example, the comparison of average transmit power to a threshold set relative to a power requirement associated with a higher data rate may trigger an upward rate adjustment if the comparison indicates that there is sufficient power margin for reliable operation at the higher data rate. Thus, the upward rate adjustment threshold may be set in relation to the upper power bound of the next higher data rate.

An exemplary radio base station comprises transmitter circuits to transmit radio signals on one or more forward link communication channels to mobile stations; and a forward link processing circuit to control the transmitter circuits. Exemplary forward link processing circuits are configured to set a data rate for a communication channel to be used for transmitting data to a mobile station at a variable transmit power that is controlled upward and downward by the mobile station as needed to achieve a desired received data quality at the mobile station. These circuits include a rate adaptor circuit that is configured to monitor transmit power information for the communication channel as an indication of current radio conditions at the mobile station, and change the data rate for the communication channel based on the transmit power information.

By way of non-limiting examples, the transmit power information monitored by the radio base station for a given communication channel of interest may comprise an average of the actual transmit power being used to transmit data on the channel. For example, the base station may filter (smooth) power values over a given number of transmit frames, and it may apply different filters such that it makes downward rate adjustments more quickly than it makes upward rate adjustments. Alternatively or additionally, the base station may monitor forward link power control commands (bits) from the mobile station. For example, if a large percentage of those commands are up commands, the base station infers that the channel data rate is too high for current radio conditions at the mobile station. Conversely, if a large percentage of the commands are down commands, it infers that the mobile station could support a higher data rate.

While the present invention may have particular applicability to rate adaptation for forward link supplemental channels in cdma2000 networks, it is not limited to such networks. Further, those skilled in the art will recognize additional features and advantages in light of the following detailed discussion and the accompanying figures.

BRIEF DESCRIPTION OF THE DRAWINGS

FIG. 3 is a diagram of typical per-frame transmit power variations for a given communication channel of interest.

FIG. 4 is diagram of typical forward link power control commands as might be returned to a network radio base station from a particular mobile station.

FIG. 5 is a diagram of exemplary filters to transmit power information for rate adaptation monitoring.

DETAILED DESCRIPTION OF THE INVENTION

Figure 1:
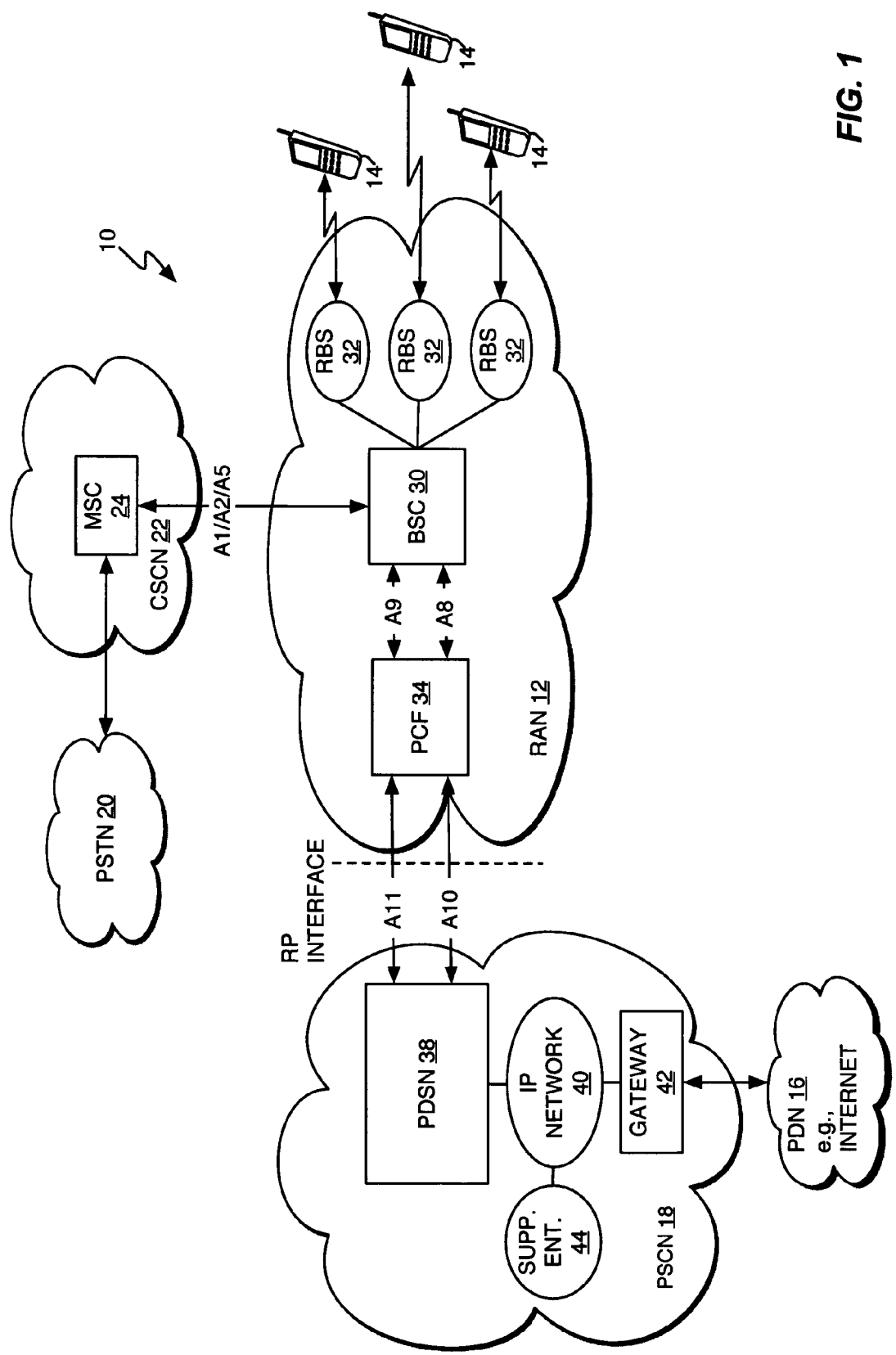
FIG. 1 is a diagram of an exemplary wireless communication network according to an embodiment of the present invention.

FIG. 1 illustrates an exemplary wireless communication network 10 that generally may be configured according to known communication standards. For example, network 10 may comprise a cdma2000 network based on IS-2000/2001 standards. It should be understood that network 10 also could be configured according to other standards as needed or desired, including Wideband (WCDMA) standards, for example.

Regardless, network 10 comprises a Radio Access Network (RAN) 12 that supports wireless communication between mobile stations 14 and one or more Public Data Networks (PDNs) 16, such as the Internet, based on its Radio-Packet (RP) interface with Packet Switched Core Network (PSCN) 18. RAN 12 also may be configured to carry voice and other circuit-switched communication traffic between the mobile stations 14 and users of the Public Switched Telephone Network (PSTN) 20 based on its traffic and signaling interfaces with Circuit-Switched Core Network (CSCN) 22, which typically includes a Mobile Switching Center (MSC) 24 to handle voice call setup/teardown, etc.

In any case, an exemplary RAN 12 comprises one or more Base Station Controllers (BSCs) 30, each one associated with one or more Radio Base Stations (RBSs) 32. A Packet Control Function (PCF) 34 is associated (or integrated) with each BSC 30, and provides an interface to a Packet Data Serving Node (PDSN) 38 in the PSCN 18. PDSN 38 carries packet data traffic for mobile stations 16, and may be coupled through a local (private) IP network 40 to a gateway router 42 that provides access to the Internet at large, or to one or more other PDNs 16. The PSCN 18 may comprise various other entities 44, such as Home Agents and Foreign Agents to manage packet data mobility functions.

While potentially helpful in terms of understanding exemplary network operations in a broad sense, details of the CSCN 16 and PSCN 18 are not required for understanding the present invention, which generally concerns operations and equipment in RAN 12, and, in particular, concerns RBSs 32 and BSCs 30.

Figure 2:
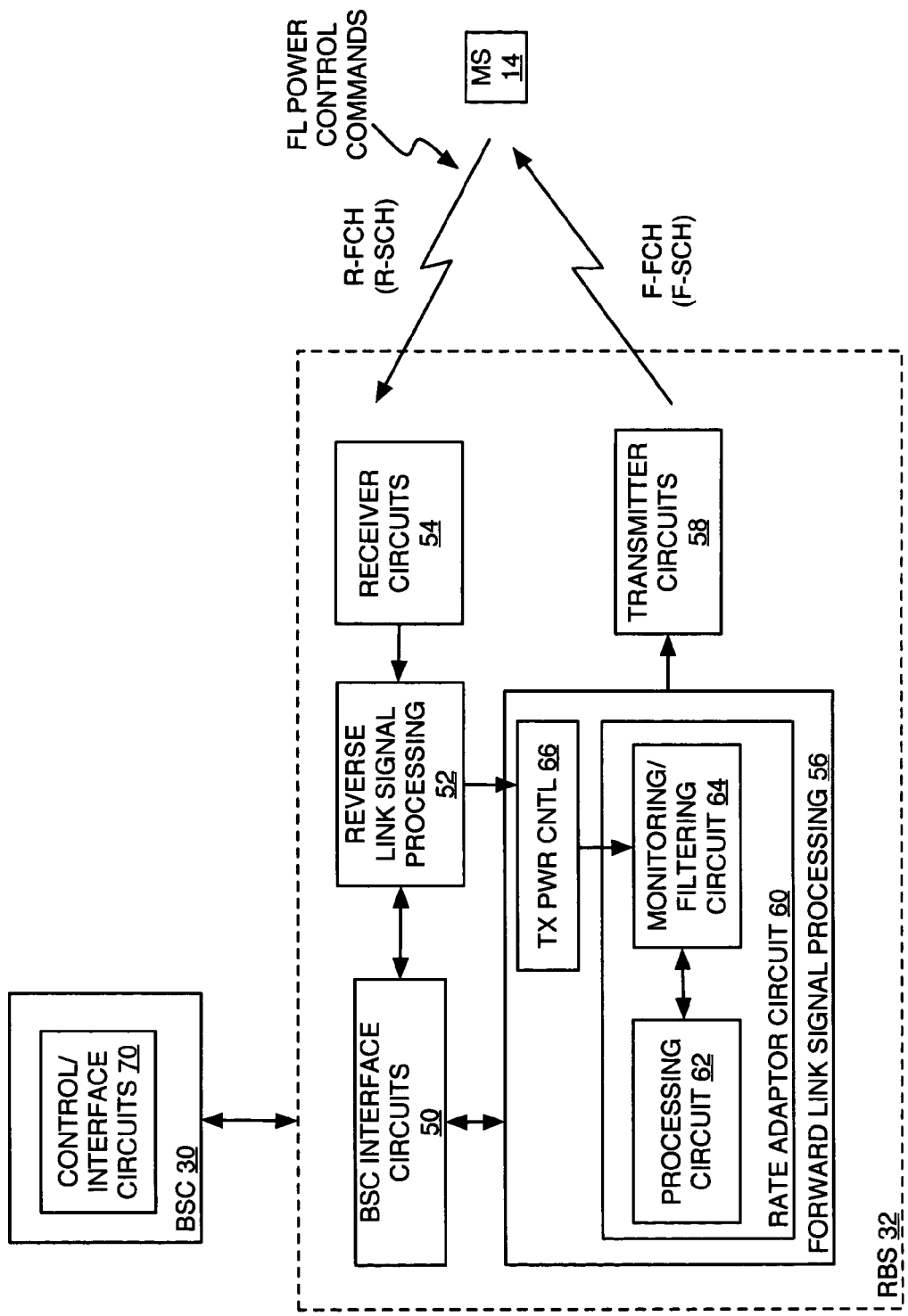
FIG. 2 is a diagram of an exemplary radio base station.

Turning, then, to exemplary details for an RBS 32 configured according to one or more embodiments of the present invention, FIG. 2 illustrates that RBS 32 functionally comprises BSC interface circuits 50, reverse link signal processing circuits 52 and associated receiver circuits 54, forward link signal processing circuits 56 and associated transmitter circuits 58. Forward link signal processing circuits 56 comprise a rate adaptor circuit 60 that includes a processing circuit 62 and one or more monitoring/filtering circuits 64, which may be integrated with the processing circuit 62. A forward link (transmit) power control circuit 66 may be associated with, or included in, the forward link signal processing circuits 56.

These various functional elements can be implemented in hardware, software, or both, and the exemplary RBS 32 includes one or more microprocessor circuits, such as Digital Signal Processors (DSPs), and associated supporting circuits, such as memory, etc. As such, in an exemplary embodiment, the present invention, including rate adapator circuit 60, is implemented at least in part as a computer program stored in memory for execution in one or more RBS microprocessor circuits.

RBS 32 supports wireless communication to and from individual ones of the mobile stations 14 by transmitting signals to the mobile stations 14 using one or more forward link channels and receiving signals from the mobile stations 14 using one or more reverse link channels. In an exemplary embodiment, each mobile station 14 is served using one or more dedicated (mobile-specific) forward and reverse link channels.

Power control loops on the forward and reverse links operate to maintain the forward and reverse link channel transmit powers substantially at, but preferably not higher than, the levels needed to achieve a desired received signal level quality at both the RBS 32 and at the mobile stations 14. For example, for a particular mobile station 14, the RBS 32 sends reverse link power control commands at a defined rate to the mobile station 14, and mobile station 14 moves its transmit power up or down according to the commands. Thus, if the RBS 32 is receiving the mobile station's reverse link signals below a targeted signal-to-noise ratio, it sends up commands to the mobile station and, conversely, if it is receiving the mobile station's signal above the targeted signal quality, it sends down commands. According to this scheme, then, the transmit power from the mobile station 14 moves up and down as needed to achieve the desired signal quality at the RBS 32.

Similarly, the mobile station 14 sends forward link power control commands, e.g., Power Control Bits or PCBs, to the RBS 32 that command the RBS 32 to increase or decrease its transmit power to the mobile station 14 according to a desired received signal quality at the mobile station 14. For example, the mobile station 14 may compute a target received signal quality and then send up or down power commands to RBS 32 as needed to maintain the received signal quality at or around that target. Along with this, the mobile station 14 may monitor a Frame Error Rate (FER) for data received from the RBS 32 and may raise or lower the received signal quality target depending on whether the FER is high or low.

Link power control of this nature generally is well understood by those skilled in the art, however, according to the present invention, transmit power information associated with such closed loop power control is used to make channel data rate adaptations. For example, in the context of F-SCHs in cdma2000 networks, the present invention may be used to provide dynamic rate adaptation for a given F-SCH based on the transmit power of that F-SCH. More broadly, the present invention provides a relatively fast, e.g., per transmit frame or better, methodology for performing channel rate adaptation based on transmit power information. According to a broad embodiment, a relatively high transmit power indicates that the channel data rate should be adapted downward and a relatively low transmit power indicates that the channel data rate should be adapted upward. As such, the present invention can be applied to essentially any communication channel that is rate adjustable. Such application may be particular beneficial where the channel in question lacks an explicit rate control feedback mechanism keyed to received signal quality at the remote receiver.

As an example, FIG. 3 illustrates the changing transmit powers used by RBS 32 for the transmission of data to a particular mobile station 14 on a F-SCH assigned to that mobile station 14. In general, the transmit power required for a F-SCH depends on its configured data rate, the path loss on the forward link, and the interference at the remote receiver, i.e., at the targeted mobile station 14. Broadly, then, the required transmit power is a function of channel data rate and overall radio conditions. As shown in the illustration, the required transmit power varies over time—four frames are illustrated—as a function of changing radio conditions.

FIG. 4 illustrates a typical stream of up/down power control commands as might be sent by the mobile station 14 to the RBS 32 to control the forward link transmission power used by the RBS 32 to transmit to the mobile station 14. For example, the mobile station 14 commands the RBS 32 to increase its transmit power by sending up commands if the mobile station is experiencing too many errors in the data it receives from RBS 32. Conversely, as explained above, mobile station 14 sends down power control commands to RBS 32 if the mobile station 14 is receiving data at an error rate lower than the target. Of course, in normal operation, with fast fading and other dynamic variations in radio conditions, the power control commands streamed back to the RBS 32 from the mobile station 14 comprise an ever changing mix of up and down power control commands. However, in general, the commands are predominantly up commands where the mobile station 14 is experiencing excessive received data errors, and the commands are predominantly down commands where the mobile station is experiencing relatively few data errors.

FIG. 5 illustrates an exemplary approach to transmit power information monitoring that may be adopted by the RBS 32 of FIG. 3 for rate adaptation of a particular forward link channel of interest, wherein the actual transmit power being used for the channel is monitored, or the incoming power control commands from the targeted mobile station are monitored. Thus, in a first exemplary embodiment, the rate adaptor circuit 60 dynamically adapts the data rate of a particular F-SCH up or down based on monitoring the actual transmit power being used to transmit on the channel. Alternatively, the rate adaptor circuit 60 dynamically adapts the rate based on the power control commands returned by the mobile station 14.

In either case, the monitor/filter circuits 64 may comprise one or more filter circuits 72. In an exemplary embodiment, the raw power data (either values corresponding to the transmit power or to the incoming stream of power control commands) is routed into a first filter 72-1 that is configured with a first filter time constant to effect a desired amount of filtering. Optionally, the data also is routed into a second filter 72-2 that is configured with a second filter time constant to effect a desired amount of smoothing. In one configuration, the first filter time constant is set less than the second filter time constant such that the first filtered values output by filter 72-1 more rapidly track changes in the pre-filtered data, while the second filtered values output by filter 72-2 exhibit a greater degree of smoothing.

It may be desirable, for example, to make downward rate adjustments more quickly than upward rate adjustments. Thus, downward rate adjustment decisions may be made based on monitoring the first filtered values relative to defined thresholds, and upward rate adjustments may be made based on monitoring the second filtered values relative to the same or different thresholds.

Figure 6:
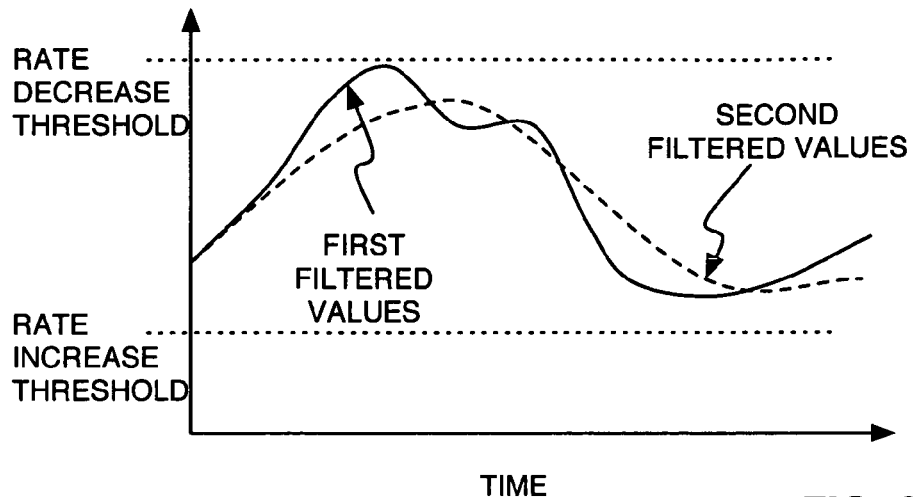
FIG. 6 is a diagram of first and second filtered values illustrating the use of different, e.g., fast and slow, filter time constants for rate adaptation monitoring.

FIG. 6 illustrates such an embodiment, and one sees that that the second filtered values exhibit greater smoothing, i.e., a longer filter time constant, than the first filtered values. Further, one sees that both sets of filtered values change over time relative to defined upper and lower limits. If the filtered values are derived from the actual channel transmit power, then the upper and lower limits can be set at the minimum and maximum powers defined for the channel. Transmit power control circuits 66 that provide forward link transmit power for the individual communication channels can be configured to provide the rate adaptor circuit 60 with the transmit power information for any number of channels subject to rate adaptation according to the present invention.

If the filtered values used for rate adaptation are derived from the mobile station's power control commands, then the upper and lower limits can be set at percentage or fractional values. For example, if a "0" defines a down power command and a "1" defines an up power command, then the filtered values will range from a minimum of zero (all "0s" received) to a maximum of one (all "1s" received). A value of about 0.5 would represent a more or less even mix of up and down commands. Thus, the lower limit could be set at 0.25 and the upper limit could be set at 0.75. The lower limit would be reached if the larger percentage of power control commands incoming from the mobile station 14 were down commands, and the upper limit would be reached if the larger percentage were up commands. Of course, those skilled in the art will recognize that these are merely example limits that can be changed as needed or desired.

Additionally, those skilled in the art will recognize the opportunity to vary the filtering process as needed or desired. In an exemplary embodiment, the filter characteristics may be configured to achieve a desired averaging response. Filter performance may be adjusted by configuring the number of transmit frames over which the transmit information is developed, i.e., the number of transmit frames over which the average is determined. In an exemplary embodiment, new transmit power information is available per 20 ms frame. Similarly, in embodiments that derive transmit power information from the incoming power control commands, filter performance can be adjusted by changing the number of commands that are averaged. Incoming power control commands are received at up to 800 Hz (every 1.25 ms), and averaging operations can be configured to balance smoothness with responsiveness.

Further, regardless of filter configuration, it may be desirable to "reset" filtering after a rate increase or decrease. Such filter resetting helps prevent false re-triggering of the rate adaption method immediately after a rate change. As an exemple, the method may include resetting the transmit power information to half the last filtered power value determined prior to a rate decrease, or to double the last value determined prior to a rate increase. Of course, other reset values can be used and, if separate filters are used for triggering rate increases and decreases, reset operations may be tailored to each individual filter.

Figure 7:
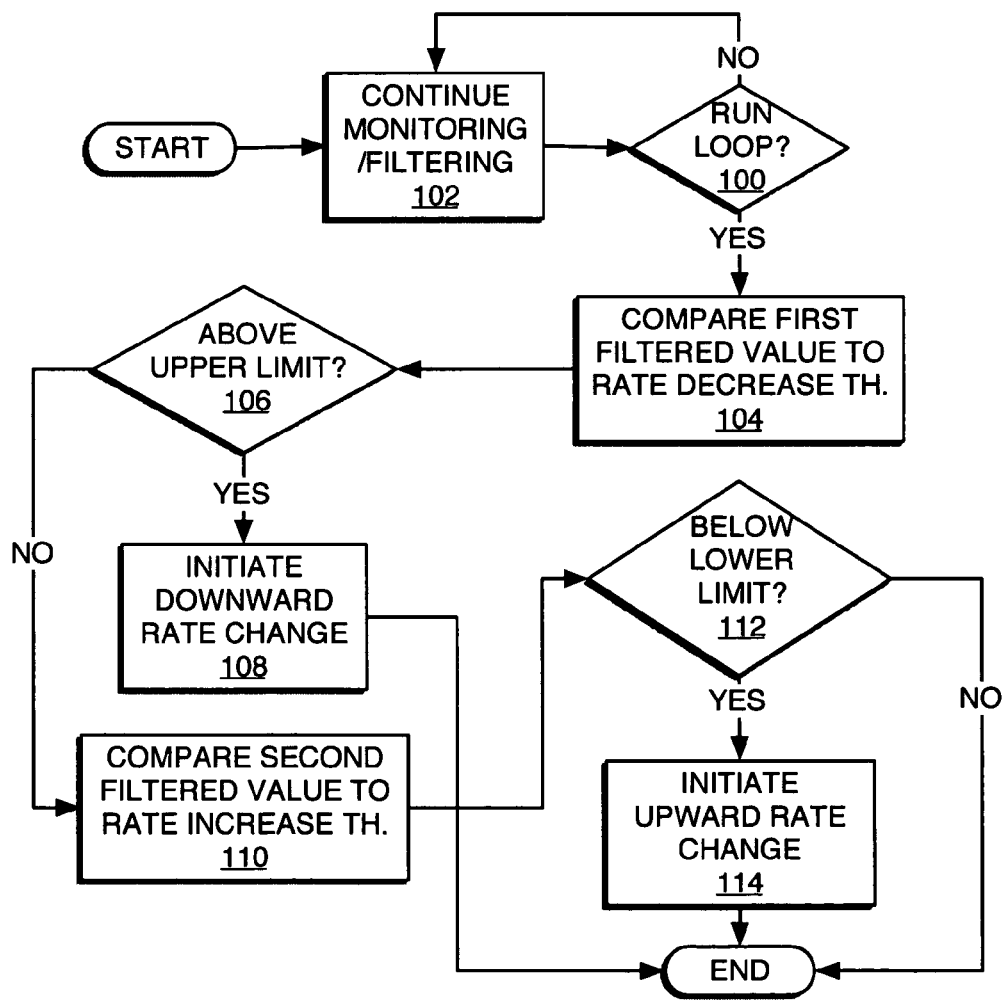
FIG. 7 is a diagram of exemplary processing logic for rate adaptation according to an embodiment of the present invention.

Regardless, FIG. 7 illustrates exemplary rate adaptation processing. In general, processing comprises ongoing transmit power information monitoring (Step 100) wherein the desired transmit power information is filtered (using one or more filters as needed or desired) for use in rate adaptation. Rate adaptation may be run at essentially any rate desired, depending on the availability of transmit power information. For example, in cdma2000 networks, frame transmit power data is available on a per frame rate, e.g., every twenty milliseconds. Thus, twenty milliseconds represent an exemplary rate adjustment interval for F-SCH rate adaptation. Power control commands returned from the mobile station 14 are available at up to 800 Hz, and even with filtering the use of these power control commands supports a per-frame or better rate adaptation interval.

Thus, if it is time for rate adaptation for a given channel or channels of interest (Step 102), the rate adaptor 60 compares the first filtered value against the upper limit (Step 104). If the first filtered value is above the upper limit (Step 106), rate adaptor 60 initiates a downward rate adjustment (Step 108). If not, the rate adaptor 60 compares the second filtered value to the lower limit (Step 110). If the second filtered value is below the lower limit, the rate adaptor 60 initiates an upward rate adjustment (Step 112). If the first and second values are between the upper and lower limits, no rate adjustments are made. Processing ends with respect to the current rate adjustment interval, but it should be understood that monitoring can continue and that the above process can be repeated at the desired adjustment interval or as needed.

As an exemplary alternative to comparing filtered transmit power values to a lower power bound set relative to a current channel data rate, the rate adaptor 60 generally may compare the filtered value to a threshold derived from the power requirements of a higher data rate. For example, the filtered value may be compared to a threshold set relative to an upper power bound associated with the next higher data rate. By making that comparison, the rate adaptor 60 ensures that a sufficient power margin will exist to maintain the integrity of the call at the contemplated higher rate in consideration of normal power fluctuations. As an example, suppose that the current channel is at a rate 4× and the next higher rate is 8×. In determining whether to move from 4× to 8×, the rate adaptor 60 compares the filtered value to threshold associated with the maximum power defined for the 8× rate to determine whether to initiate the rate increase.

More generally, the rate adaptor 60 can determine whether to increase the data rate by making the comparison to a threshold that will ensure sufficient power adjustment range to maintain radio link quality at the contemplated higher rate. The comparison threshold thus should be set relative to the upper power bound defined for the contemplated data rate to allow for reasonable margin.

In initiating a rate adjustment, the rate adaptor circuit 60 may send a rate adjustment message to the BSC 30, or otherwise signal to the BSC 30 that a rate adjustment is needed. The control/interface circuits 70 of BSC 30 can be configured to respond to such signaling by sending an Extended Supplemental Channel Assignment Message (ESCAM) to the mobile station 14 to cancel the previous rate assignment of the mobile station's F-SCH and to inform the RBS 32 of the rate change so that it can reconfigure the rate accordingly.

Thus, in an exemplary embodiment directed to F-SCH rate adaptation in a cdma2000 network, RBS 32 can be configured to perform rate adaptation on any number of F-SCHs being supported by the RBS 32. For any of these channels, the RBS 32 initiates downward rate adjustments as needed in response to determining that the transmit power information for that channel indicates that a relatively higher power is required to support the current data rate of the channel. Conversely, the RBS 32 initiates upward rate adjustments as needed in response to determining that a relatively lower power is required to support the current data rate of the channel, or that the current average power is such that the next higher data rate could be supported with sufficient power margin. So configured, the RBS 32 uses transmit power information to infer whether a particular mobile station 14 is in relatively good or relatively bad radio conditions, and to make the correspondingly appropriate rate adaptation.

As noted, the present invention has particular applicability to F-SCH rate adaptation in cdma2000 networks, but those skilled in the art will recognize that the present invention can be applied to essentially any type of channel in any type of network where adaptive rate control is desired, and where transmit power information for the channel varies as a function of received signal quality at the targeted receiver. As such, the present invention is not limited by the foregoing discussion, but rather is limited only by the following claims and their reasonable equivalents.

What is claimed is:

1. A method of channel data rate adaptation in a wireless communication network, the method comprising:
   setting a data rate for a communication channel to be used for transmitting data to a remote receiver at a variable transmit power that is controlled upward and downward by the remote receiver as needed to achieve a desired received data quality at the remote receiver;
   monitoring transmit power information for the communication channel as an indication of current radio conditions at the remote receiver by generating filtered values of the transmit power, including generating a first filtered value for use in determining whether to initiate a downward rate change and generating a second filtered value for use in determining whether to initiate an upward rate change, and further comprising using a longer filter time constant to generate the second filtered value as compared to the first filtered value;
   changing the data rate for the communication channel based on the transmit power information by comparing the first and second filtered values against defined upper and lower power limits.

2. The method of claim 1, wherein setting a data rate for a communication channel to be used for transmitting data to a remote receiver at a variable transmit power comprises setting the data rate of a communication channel assigned to the remote receiver to a desired data rate.

3. The method of claim 1, wherein comparing the first and second filtered values against defined upper and lower power limits comprises initiating a downward rate change if the first filtered value approaches the upper power limit, and initiating an upward rate change if the second filtered value approaches the lower power limit.

4. The method of claim 1, further comprising setting the lower power limit relative to an upper power bound associated with a higher data rate, such that a change to that higher data rate is not initiated unless the comparison indicates that a desired power margin would exist if the data rate is increased to the higher data rate.

5. The method of claim 1, wherein said filtered values of the transmit power are generated as averages of the transmit power used for transmission of data on the communication channel, wherein a high average power indicates relatively poor current radio conditions at the remote terminal and wherein a low average power indicates relatively good current radio conditions at the remote terminal.

6. The method of claim 1 further comprising updating the transmit power information according to a defined transmission frame timing associated with the communication channel.

7. The method of claim 6, wherein updating the transmit power information according to a defined transmission frame timing associated with the communication channel comprises updating the transmit power information on at least a per frame basis.

8. The method of claim 1, wherein monitoring transmit power information for the communication channel as an indication of current radio conditions at the remote receiver comprises monitoring power control commands sent from the remote receiver that are associated with controlling the transmit power of the communication channel, and wherein generating filtered values of the transmit power comprises generated filtered values of the power control commands.

9. The method of claim 8, further comprising determining whether the filtered values of the power control commands indicate predominantly up commands or indicate predominantly down commands.

10. The method of claim 9, wherein changing the data rate for the communication channel based on the transmit power information comprises initiating a downward rate change if the filtered values of the power control commands indicate predominantly up commands.

11. The method of claim 9, wherein changing the data rate for the communication channel based on the transmit power information comprises initiating an upward rate change if the filtered values of the power control commands indicate predominantly down commands.

12. The method of claim 1, wherein the network comprises a cdma2000 network and the communication channel comprises a forward link supplemental channel (F-SCH) at a radio base station in the network to be used for serving a particular mobile station, and wherein changing the data rate for the communication channel based on the transmit power information comprises sending a rate change request for the forward link supplemental channel from the radio base station to an associated base station controller.

13. The method of claim 12, further comprising sending an extended supplemental channel assignment message from the base station controller for transmission to the remote receiver to inform the remote receiver of a change in a current data rate assignment of the forward link supplemental channel.

14. A radio base station for use in a wireless communication network, the radio base station comprising:
transmitter circuits to transmit radio signals on one or more forward link communication channels to mobile stations; and
a forward link processing circuit to control the transmitter circuits;
said forward link processing circuit configured to set a data rate for a communication channel to be used for transmitting data to a mobile station at a variable transmit power that is controlled upward and downward by the mobile station as needed to achieve a desired received data quality at the mobile station; and
said forward link processing circuit comprising a rate adaptor circuit configured to:
monitor transmit power information for the communication channel as an indication of current radio conditions at the mobile station by generating filtered values of the transmit power, including generating a first filtered value for use in determining whether to initiate a downward rate change and generating a second filtered value for use in determining whether to initiate an upward rate change, and further comprising using a longer filter time constant to generate the second filtered value as compared to the first filtered value; and
change the data rate for the communication channel based on the transmit power information by comparing the first and second filtered values against defined upper and lower power limits.

15. The radio base station of claim 14, wherein the radio base station is configured to set the data rate for the communication channel to a desired value and the rate adaptor circuit is configured to adapt the data rate as needed based on monitoring the transmit power information.

16. The radio base station of claim 14, wherein the rate adaptor circuit comprises one or more filter circuits to generate the filtered.

17. The radio base station of claim 14, wherein the rate adaptor circuit is configured to generate the filtered values as averages of the transmit power used for transmission of data on the communication channel.

18. The radio base station of claim 14, wherein the rate adaptor circuit is configured to update the transmit power information according to a defined transmission frame timing associated with the communication channel.

19. The radio base station of claim 18, wherein the rate adaptor circuit updates the transmit power information on at least a per frame basis.

20. The radio base station of claim 14, wherein the rate adaptor circuit is configured to generate the filtered values by filtering power control commands sent from the mobile station that are associated with controlling the transmit power of the communication channel.

21. The radio base station of claim 20, wherein the rate adaptor circuit is configured to determine whether a greater percentage of the power control commands are up commands or are down commands based on the filtered values.

22. The radio base station of claim 21, wherein the rate adaptor circuit is configured to initiate a downward rate change if the greater percentage of the power control commands are up commands, and to initiate an upward rate change if the greater percentage of the power control commands are down commands.

23. The radio base station of claim 20, wherein the rate adaptor circuit is configured to filter the power control commands according to a first filter time constant to generate the first filtered value for use in determining whether to initiate a downward rate change, and is configured to filter the power control commands according to a second, longer filter time constant to generate the second filtered value for use in determining whether to initiate an upward rate change.

24. The radio base station of claim 20, wherein the rate adaptor circuit is configured to initiate a downward rate change if the power control commands predominantly are up commands, and to initiate an upward rate change if the power control commands predominantly are down commands.

25. The radio base station of claim 14, wherein the radio base station comprises an IS-2000 radio base station for use in a cdma2000 wireless communication network, and the communication channel comprises a forward link supplemental channel (F-SCH) to be used for serving a particular mobile station, and wherein the radio base station is configured to change the data rate by sending a rate change request for the forward link supplemental channel to an associated base station controller.

26. The radio base station of claim 25, wherein the base station controller is configured to send an extended supplemental channel assignment message for transmission to the mobile station to inform the mobile station of a changed data rate assignment for the forward link supplemental channel.

27. A method of channel data rate adaptation in a wireless communication network, the method comprising:

setting a data rate for a communication channel to be used for transmitting data to a remote receiver at a variable transmit power that is controlled upward and downward by the remote receiver as needed to achieve a desired received data quality at the remote receiver;

monitoring transmit power information for the communication channel as an indication of current radio conditions at the remote receiver by monitoring power control commands sent from the remote receiver that are associated with controlling the transmit power of the communication channel, said monitoring including generating one or more filtered values of the power control commands and determining whether the one or more filtered values indicate predominantly up commands or indicate predominantly down commands, based on generating a first filtered value according to a first filter time constant and generating a second filtered value according to a second filter time constant; and changing the data rate for the communication channel based on the transmit power information by basing the determination of downward rate changes on the first filtered value and basing the determination of upward rate changes on the second filtered value.

28. A method of channel data rate adaptation in a wireless communication network, the method comprising:

setting a data rate for a communication channel to be used for transmitting data to a remote receiver at a variable transmit power that is controlled upward and downward by the remote receiver as needed to achieve a desired received data quality at the remote receiver;

monitoring transmit power information for the communication channel as an indication of current radio conditions at the remote receiver by maintaining one or more filtered values indicative of transmit power for the communication channel;

changing the data rate for the communication channel based on the transmit power information by comparing one or more filtered values to one or more rate change threshold values to determine whether a rate change is warranted;

resetting at least one of the one or more filtered values responsive to initiating a rate increase or a rate decrease; and after initiating a rate increase based on a filtered value, resetting the filtered value to be greater than it was before the rate increase was initiated.

29. A method of channel data rate adaptation in a wireless communication network, the method comprising:

setting a data rate for a communication channel to be used for transmitting data to a remote receiver at a variable transmit power that is controlled upward and downward by the remote receiver as needed to achieve a desired received data quality at the remote receiver;

monitoring transmit power information for the communication channel as an indication of current radio conditions at the remote receiver by maintaining one or more filtered values indicative of transmit power for the communication channel;

changing the data rate for the communication channel based on the transmit power information by comparing one or more filtered values to one or more rate change threshold values to determine whether a rate change is warranted;

comprising resetting at least one of the one or more filtered values responsive to initiating a rate increase or a rate decrease; and after initiating a rate decrease based on a filtered value, resetting the filtered value to be less than it was before the rate decrease was initiated.

30. A radio base station for use in a wireless communication network, the method comprising:

transmitter circuits to transmit radio signals on one or more forward link communication channels to mobile stations; and a forward link processing circuit to control the transmitter circuits;

said forward link processing circuit configured to set a data rate for a communication channel to be used for transmitting data to a mobile station at a variable transmit power that is controlled upward and downward by the mobile station as needed to achieve a desired received data quality at the mobile station;

said forward link processing circuit comprising a rate adaptor circuit configured to:

monitor transmit power information for the communication channel as an indication of current radio conditions at the mobile station; and change the data rate for the communication channel based on the transmit power information;

wherein the rate adaptor circuit comprises one or more filter circuits to generate one or more filtered values related to transmit power for the communication channel as the transmit power information, and wherein the rate adaptor circuit is configured to monitor the transmit power information for the communication channel by comparing the one or more filtered values against one or more rate change thresholds;

wherein the rate adaptor circuit is configured to reset at least one of the one or more filtered values responsive to initiating a rate increase or a rate decrease; and wherein, after initiating a rate increase based on a filtered value, the rate adaptor circuit is configured to reset the filtered value to be greater than it was before the rate increase was initiated.

31. A radio base station for use in a wireless communication network, the method comprising:

transmitter circuits to transmit radio signals on one or more forward link communication channels to mobile stations; and a forward link processing circuit to control the transmitter circuits;

said forward link processing circuit configured to set a data rate for a communication channel to be used for transmitting data to a mobile station at a variable transmit power that is controlled upward and downward by the mobile station as needed to achieve a desired received data quality at the mobile station;

said forward link processing circuit comprising a rate adaptor circuit configured to:

monitor transmit power information for the communication channel as an indication of current radio conditions at the mobile station; and change the data rate for the communication channel based on the transmit power information;

wherein the rate adaptor circuit comprises one or more filter circuits to generate one or more filtered values related to transmit power for the communication channel as the transmit power information, and wherein the rate adaptor circuit is configured to monitor the transmit power information for the communication channel by comparing the one or more filtered values against one or more rate change thresholds;

wherein the rate adaptor circuit is configured to reset at least one of the one or more filtered values responsive to initiating a rate increase or a rate decrease; and wherein, after initiating a rate decrease based on a filtered value, the rate adaptor circuit is configured to reset the filtered value to be less than it was before the rate decrease was initiated.

32. A radio base station for use in a wireless communication network, the method comprising:

transmitter circuits to transmit radio signals on one or more forward link communication channels to mobile stations; and a forward link processing circuit to control the transmitter circuits;

said forward link processing circuit configured to set a data rate for a communication channel to be used for transmitting data to a mobile station at a variable transmit power that is controlled upward and downward by the mobile station as needed to achieve a desired received data quality at the mobile station; and said forward link processing circuit comprising a rate adaptor circuit configured to:

monitor transmit power information for the communication channel as an indication of current radio conditions at the mobile station; and change the data rate for the communication channel based on the transmit power information;

wherein the rate adaptor circuit comprises one or more filter circuits to generate one or more filtered values related to transmit power for the communication channel as the transmit power information, and wherein the rate adaptor circuit is configured to monitor the transmit power information for the communication channel by comparing the one or more filtered values against one or more rate change thresholds, and wherein the rate adaptor circuit is configured to generate a first filtered value according to a first filter time constant for use in determining whether to initiate a downward rate change and generate a second filtered value according to a second, longer filter time constant for use in determining whether to initiate an upward rate change.

33. A radio base station for use in a wireless communication network, the method comprising:

transmitter circuits to transmit radio signals on one or more forward link communication channels to mobile stations; and a forward link processing circuit to control the transmitter circuits;

said forward link processing circuit configured to set a data rate for a communication channel to be used for transmitting data to a mobile station at a variable transmit power that is controlled upward and downward by the mobile station as needed to achieve a desired received data quality at the mobile station; and said forward link processing circuit comprising a rate adaptor circuit configured to:

monitor transmit power information for the communication channel as an indication of current radio conditions at the mobile station; and change the data rate for the communication channel based on the transmit power information;

wherein the rate adaptor circuit comprises one or more filter circuits to generate one or more filtered values of transmit power for the communication channel, and wherein the rate adaptor circuit is configured to monitor the transmit power information for the communication channel by comparing the one or more filtered values against a rate increase threshold and a rate decrease threshold; and wherein the rate adaptor circuit is configured to set the rate increase threshold based on a power requirement associated with a higher data rate, and is further configured to initiate a change to the higher data rate if the comparison indicates that a sufficient power margin would be maintained for the communication channel at the higher data rate.

* * * * *

UNITED STATES PATENT AND TRADEMARK OFFICE
CERTIFICATE OF CORRECTION

| | | |
|---|---|---|
| PATENT NO. | : 7,573,856 B2 | Page 1 of 1 |
| APPLICATION NO. | : 10/721951 | |
| DATED | : August 11, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1659 days.

Signed and Sealed this

Seventh Day of September, 2010

David J. Kappos
*Director of the United States Patent and Trademark Office*